(12) United States Patent
Ranganathan et al.

(10) Patent No.: US 11,856,049 B2
(45) Date of Patent: Dec. 26, 2023

(54) PIN BOARD INTERFACE

(71) Applicant: ZEBRA TECHNOLOGIES CORPORATION, Lincolnshire, IL (US)

(72) Inventors: Sundar Ranganathan, Lincolnshire, IL (US); Sridhar Srinivasan, Franklin, MA (US); Venu Challa, Smyrna, MA (US); Murali Viswanathan, Medway, MA (US); Arun Santhanam, Medfield, MA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/080,602

(22) Filed: Oct. 26, 2020

(65) Prior Publication Data

US 2022/0131930 A1 Apr. 28, 2022

(51) Int. Cl.
| | | |
|---|---|---|
| *H04L 67/10* | (2022.01) | |
| *H04L 67/02* | (2022.01) | |
| *G06F 3/0482* | (2013.01) | |
| *G06F 9/451* | (2018.01) | |
| *G06F 9/54* | (2006.01) | |
| *G06F 21/33* | (2013.01) | |
| *H04L 9/40* | (2022.01) | |

(52) U.S. Cl.
CPC ............ *H04L 67/10* (2013.01); *G06F 3/0482* (2013.01); *G06F 9/451* (2018.02); *G06F 9/547* (2013.01); *G06F 21/33* (2013.01); *H04L 63/08* (2013.01); *H04L 67/02* (2013.01)

(58) Field of Classification Search
CPC ........ H04L 67/125; H04L 67/36; H04W 4/21; G06Q 50/01
See application file for complete search history.

(56) References Cited

U.S. PATENT DOCUMENTS

| | | | |
|---|---|---|---|
| 10,739,974 B2 * | 8/2020 | Wilson | G06F 3/016 |
| 10,788,953 B2 * | 9/2020 | Chaudhri | G06F 9/451 |
| 2008/0168405 A1 * | 7/2008 | Tolmasky | G06F 1/1626 |
| | | | 715/863 |
| 2011/0072492 A1 | 3/2011 | Mohler et al. | |
| 2016/0185358 A1 | 6/2016 | Todasco et al. | |
| 2016/0364893 A1 * | 12/2016 | Howard | G06T 11/60 |
| 2017/0011023 A1 * | 1/2017 | Ghannam | G06F 40/205 |
| 2017/0076507 A1 * | 3/2017 | Bivins | G06T 17/10 |
| 2017/0154089 A1 * | 6/2017 | Sherman | G06F 16/54 |
| 2017/0249610 A1 * | 8/2017 | Ferrer | G06F 21/105 |
| 2017/0357426 A1 * | 12/2017 | Wilson | G06F 16/00 |
| 2018/0181565 A1 * | 6/2018 | Spector | H04W 4/023 |

(Continued)

OTHER PUBLICATIONS

Novelty Search Report for Belgian Patent Application No. 2021/05837 dated Jun. 21, 2022.

*Primary Examiner* — Mahran Y Abu Roumi

(57) ABSTRACT

Systems and methods for processing and displaying information for multiple applications on a computing device are disclosed herein. An example method includes a mobile device retrieving, from a pinboard server, pin blocks corresponding to applications. The mobile device may then filter the pin blocks based on (i) a geolocation of the mobile device, (ii) a user profile activated on the mobile device, (iii) a time of day, (iv) a date, or (v) an activity associated with a user. The mobile device may then display the filtered pin blocks.

27 Claims, 14 Drawing Sheets

(56) References Cited

U.S. PATENT DOCUMENTS

| | | | |
|---|---|---|---|
| 2019/0158449 A1* | 5/2019 | Siegel | H04L 63/0407 |
| 2019/0163807 A1* | 5/2019 | Jain | G06F 16/245 |
| 2019/0230163 A1* | 7/2019 | Chavez | H04W 4/21 |
| 2020/0241903 A1* | 7/2020 | Wang | G06F 9/547 |
| 2020/0293167 A1* | 9/2020 | Blyumen | G06F 3/167 |
| 2021/0099568 A1* | 4/2021 | DePue | H04L 51/10 |

* cited by examiner

PIN BOARD INTERFACE

BACKGROUND

When multiple applications are involved, current systems for bringing information from servers to computing devices are often inefficient. Furthermore, once the information is brought to the computing device, the information is often displayed inefficiently. There is thus a need for improved systems that more efficiently bring information from servers for multiple applications, and further display the information more efficiently once it is received.

SUMMARY

In one aspect, there is a server having a server processor, a server memory, and a set of server instructions stored in the server memory, the server being configured to execute the server instructions, via the server processor, to execute a plurality of server-side applications; and a mobile device communicatively coupled to the server, the mobile device having a display, a mobile device processor, a mobile device memory, and a set of mobile device instructions stored in the mobile device memory, the mobile device being configured to execute the mobile device instructions, via the mobile device processor, to execute a mobile device application. Based on at least two of (i) a geolocation of the mobile device, (ii) a user profile activated on the mobile device, (iii) a time of day, (iv) a date, or (v) an activity associated with a user, the mobile device application is configured to transmit messages to respective ones of a subset of the plurality of server-side applications that include a request for data from the respective server-side application. Responsive to receiving the one or more messages from the mobile device application, the server-side applications are configured to obtain respective data, and transmit the data to the mobile device application; and, responsive to receiving the obtained data from the subset of the server-side applications, the mobile device application displays the obtained data on the display of the mobile device in respective regions of a user interface.

In a variation of this embodiment, the mobile device application is configured to obtain a list of applicable server-side applications from the server; and determine the subset of the plurality of server-side applications from the list of applicable server-side applications based on the at least two of (i) a geolocation of the mobile device, (ii) a user profile activated on the mobile device, (iii) a time of day, (iv) a date, or (v) an activity associated with a user. In a variation on this embodiment, the mobile device application is configured to arrange the regions of the user interface based on the at least two of (i) a geolocation of the mobile device, (ii) a user profile activated on the mobile device, (iii) a time of day, (iv) a date, or (v) an activity associated with a user.

In one variation, the mobile device application is configured to determine the subset of the plurality of server-side applications additionally based on a user input.

In one variation, the server is configured to generate the list of all applicable server-side applications based on one or more logon credentials for the user.

In one variation, the server is configured to implement an authentication service, and wherein the mobile device application is configured to authenticate the user with the authentication service based on one or more logon credentials to obtain an authentication token, and obtain the list of applicable server-side applications from the server based on the authentication token.

In one variation, the list of applicable server-side applications includes, for each server-side application of the list of applicable server-side applications a respective address for obtaining data from the respective server-side application.

In one variation, the address comprises a uniform resource locator.

In one variation, when one of the respective regions of the user interface is activated, transmitting a message to the respective server-side application via a different address for obtaining further data from the respective server-side application, wherein the further data represents an interactive user interface displayed in another region of the user interface.

In one variation, the system further includes an application server having an application processor, an application memory, and a set of application instructions stored in the application memory, the application server being configured to execute the application instructions, via the application processor, to execute a third-party server-side application, wherein, based on the at least two of (i) a geolocation of the mobile device, (ii) a user profile activated on the mobile device, (iii) a time of day, (iv) a date, or (v) an activity associated with a user, the mobile device application is configured to transmit a message to the application server to obtain data from the third-party server-side application.

In one variation, the mobile device application is configured to display the obtained data on the display of the mobile device based on based on at least two of (i) the geolocation of the mobile device, (ii) the user profile activated on the mobile device, (iii) the time of day, (iv) the date, or (v) the activity associated with a user.

In one variation, the mobile device application is configured to display the obtained data on the display of the mobile device based on a template for a region of the display.

In one variation, the messages are transmitted over a network.

In one variation, the mobile device application is configured to enable the user to rearrange the regions of the user interface.

In one variation, a first of the messages requests a subset of data from the respective server-side application.

In one variation: the subset of the plurality of server-side applications is a first subset of the plurality of server-side applications determined based on a first at least two of (i) a geolocation of the mobile device, (ii) a user profile activated on the mobile device, (iii) a time of day, (iv) a date, or (v) an activity associated with a user during a first period of time; and the mobile device application is configured to select a second subset of the plurality of server-side applications determined based on a second at least two of (i) a geolocation of the mobile device, (ii) a user profile activated on the mobile device, (iii) a time of day, (iv) a date, or (v) an activity associated with a user during a second period of time, and transmit messages to respective ones of the second subset of the plurality of server-side applications that include a request for data from the respective server-side application.

In another aspect, there is a non-transitory computer-readable medium storing computer-readable instructions that, when executed by a processor, causes a mobile device to: during a first time period: select a first subset of a plurality of server-side applications based on at least a first two of (i) a geolocation of the mobile device, (ii) a user profile activated on the mobile device, (iii) a time of day, (iv) a date, or (v) an activity associated with a user, transmit messages to respective ones of the first subset of the plurality of server-side applications that each include a request for data from the respective server-side application, and responsive to receiving data from each of the first subset of the plurality of server-side applications, display the data in a respective region of a user interface on a display; and during a second time period: select a second subset of a plurality of server-side applications based on at least a second two of (i) a geolocation of the mobile device, (ii) a user profile activated on the mobile device, (iii) a time of day, (iv) a date, or (v) an activity associated with a user, transmit messages to respective ones of the second subset of the plurality of server-side applications that each include a request for data from the respective server-side application, and responsive to receiving data from each of the second subset of the plurality of server-side applications, display the data in a respective region of the user interface on the display.

In one variation, the instructions, when executed by the processor, cause the mobile device to obtain a list of applicable server-side applications from a server, wherein the list of applicable server-side applications is determined based on one or more logon credentials for the user.

In yet another aspect, there is a non-transitory computer-readable medium storing computer-readable instructions that, when executed by a processor, causes an application server to: in response to a first query received from a remote device at a first uniform resource locator (URL) assigned to an instance of an application executing on the application server for a user, provide a first subset of data related to the instance of the application that represents information to be displayed in a first region of a first user interface on a display of the remote device; in response to a second query received from the remote device at a second URL assigned to the instance of the application, provide information that represents a web view to be displayed in a second region of the first user interface to enable the user to operate first aspects of the instance of the application; and present a second user interface arranged for the user to operate second aspects of the instance of the application.

In one variation, the second user interface comprises an interface of a native application running on the application server.

In one variation, the first aspects are a subset of the second aspects.

In one variation, the second query comprises a user selection of a block in the first region in the first interface.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 4 illustrates an example display where the user has not clocked in.

FIG. 5 illustrates an example display where the user has clocked in.

Figure 1:
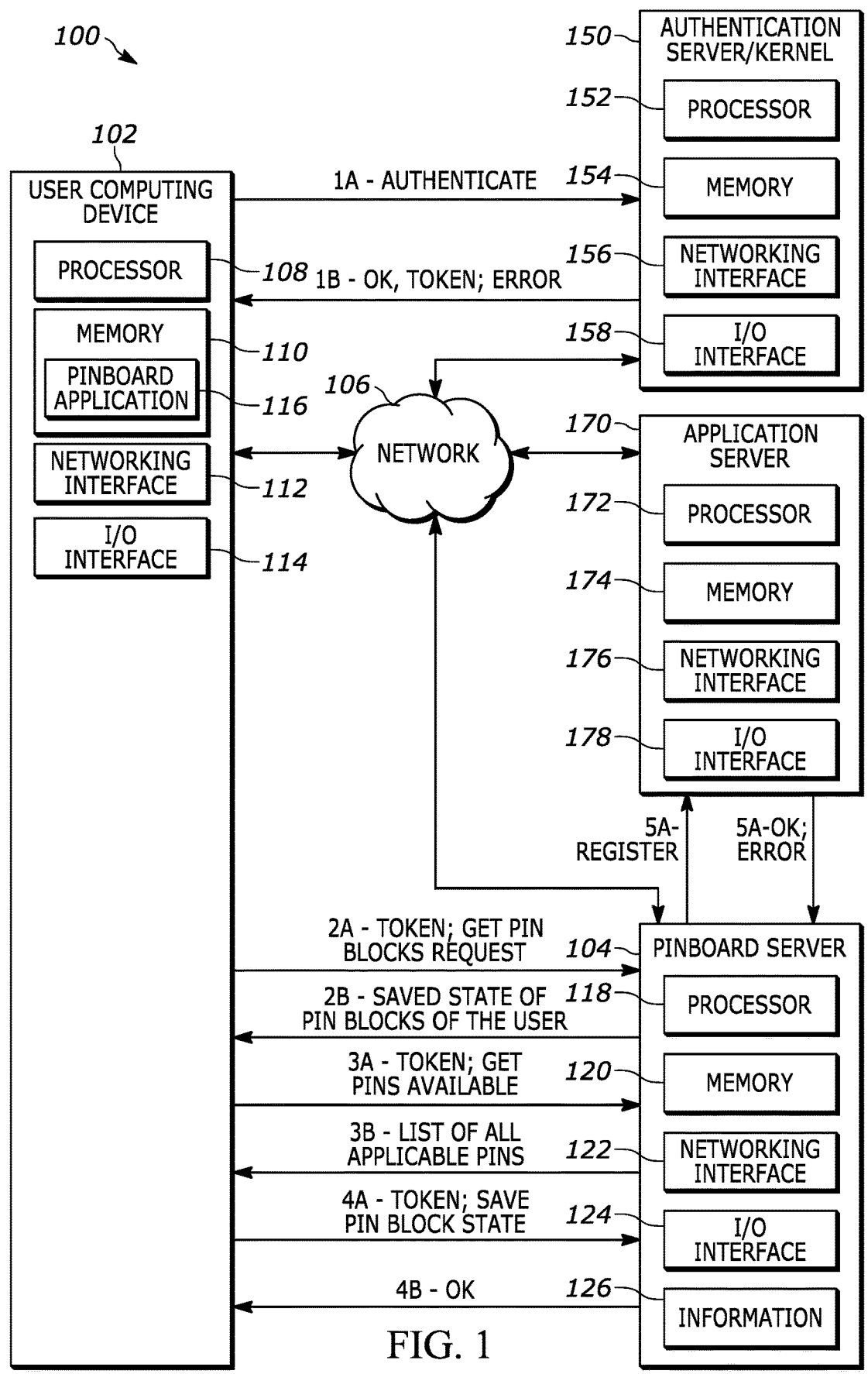
FIG. 1 is an example pinboard system for process information, and consolidating the information onto a display of a computing device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present disclosure provides techniques to facilitate processing information (e.g., from applications), and consolidating the information on a display of a user computing device (e.g., a mobile phone or device). In some implementations, this consolidation is, in part or in whole, accomplished by "pinning" blocks (e.g., "pins") to regions of a display. In some embodiments, a block represents data obtained from a corresponding application.

FIG. 1 illustrates an example pinboard system 100 configured to process information, and consolidate the information onto a display of a user computing device 102, in accordance with various embodiments disclosed herein. In the example embodiment of FIG. 1, the pinboard system 100 includes the user computing device 102, an authentication server/kernel 150, one or more application servers 170, and a pinboard server 104 communicatively coupled together via a network 106.

Generally speaking, the user computing device 102 is configured to run a pinboard application 116, in accordance with the various embodiments disclosed herein. The user computing device 102 may include one or more processors 108, one or more memories 110, a networking interface 112, an input/output interface 114, and the pinboard application 116.

In some implementations, the authentication server/kernel 150 is used primarily for user authentication. The authentication server/kernel 150 may include one or more processors 152, one or more memories 154, a networking interface 156, and an input/output interface 158.

In some embodiments, and as will be discussed in more detail below, the pinboard server 104 stores information 126 to be retrieved by the user computing device 102. The pinboard server 104 may include one or more processors 118, one or more memories 120, a networking interface 122, and input/output interface 124.

In some embodiments, the application server 170 is used to run one or more applications, which may be accessed by the user computing device 102. The application server 170 may include one or more processors 172, one or more memories 174, a networking interface 176, and input/output interface 178. In addition, although the example of FIG. 1 illustrates one application server 170, it should be understood that the system may comprise any number of application servers 170, each with the components illustrated in FIG. 1, and each running one or more applications. Furthermore, although illustrated separately, in some implementations, the application server 170 and the pinboard server 104 are the same server with the same components.

Each of the one or more memories 110, 120, 154, 174 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., pinboard application 116, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 108, 118, 152, 172 (e.g., working in connection with the respective operating system in the one or more memories 110, 120, 154, 174) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

The one or more memories 110, 120, 154, 174 may store an operating system (OS) (e.g., Microsoft Windows, Linux, Unix, iOS, Android, etc.) capable of facilitating the functionalities, apps, methods, or other software as discussed herein. The one or more memories 110, 120, 154, 174 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein.

The one or more processors 108, 118, 152, 172 may be connected to the one or more memories 110, 120, 154, 174 via a computer bus responsible for transmitting electronic data, data packets, or otherwise electronic signals to and from the one or more processors 108, 118, 152, 172 and one or more memories 110, 120, 154, 174 in order to implement or perform the machine readable instructions, methods, processes, elements or limitations, as illustrated, depicted, or described for the various flowcharts, illustrations, diagrams, figures, and/or other disclosure herein.

The one or more processors 108, 118, 152, 172 may interface with the one or more memories 110, 120, 154, 174 via the computer bus to execute the operating system (OS). The one or more processors 108, 118, 152, 172 may also interface with the one or more memories 110, 120, 154, 174 via the computer bus to create, read, update, delete, or otherwise access or interact with the data stored in the one or more memories 110, 120, 154, 174 and/or external databases (e.g., a relational database, such as Oracle, DB2, MySQL, or a NoSQL based database, such as MongoDB). The data stored in the one or more memories 110, 120, 154, 174 and/or an external database may include all or part of any of the data or information described herein.

The networking interfaces 112, 122, 156, 176 may be configured to communicate (e.g., send and receive) data via one or more external/network port(s) to one or more networks or local terminals, such as network 106, described herein. In some embodiments, networking interfaces 112, 122, 156, 176 may include a client-server platform technology such as ASP.NET, Java J2EE, Ruby on Rails, Node.js, a web service or online API, responsive for receiving and responding to electronic requests. The networking interfaces 112, 122, 156, 176 may implement the client-server platform technology that may interact, via the computer bus, with the one or more memories 110, 120, 154, 174 (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

According to some embodiments, the networking interfaces 112, 122, 156, 176 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to network 106. In some embodiments, network 106 may comprise a private network or local area network (LAN). Additionally or alternatively, network 106 may comprise a public network such as the Internet. In some embodiments, the network 106 may comprise routers, wireless switches, or other such wireless connection points communicating to the user computing device 102, the application server 170, the authentication server/kernel 150 and the pinboard server 104 via wireless communications based on any one or more of various wireless standards, including by non-limiting example, IEEE 802.11a/b/c/g (WIFI), the BLUETOOTH standard, or the like.

The input/output interfaces 114, 124, 158, 178 may include or implement operator interfaces configured to present information to an administrator or operator and/or receive inputs from the administrator or operator. An operator interface may provide a display screen (e.g., via the user computing device 102, authentication server/kernel 150, application server 170 and/or pinboard server 104) which a user/operator may use to visualize any images, graphics, text, data, features, pixels, and/or other suitable visualizations or information.

Figure 3:
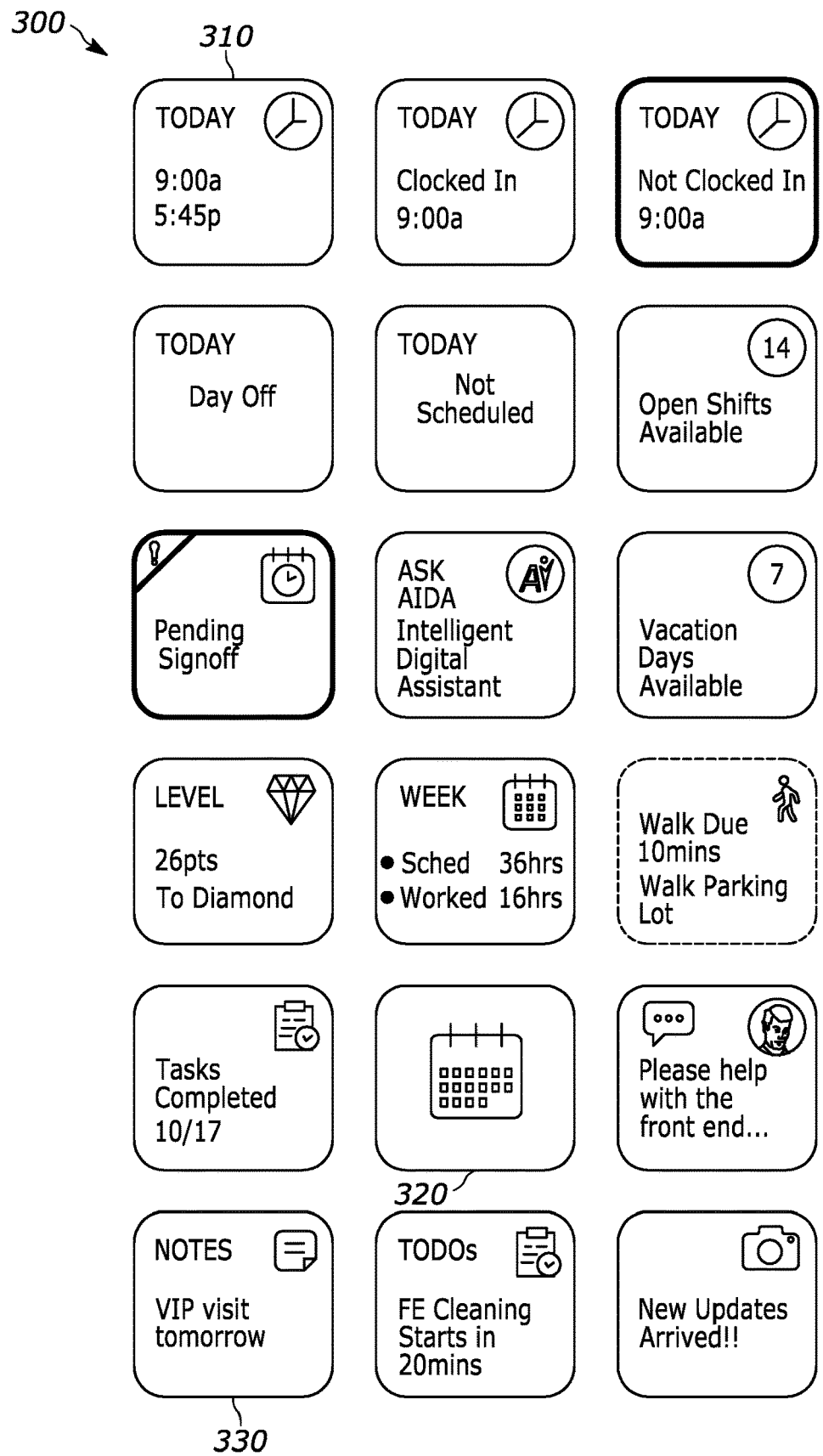
FIG. 3 illustrates a collection of example pin blocks.

By way of illustrative example, FIG. 1 further shows operations 1*a* through 5*b*, which may be used to retrieve any of the example pin blocks of FIG. 3, and which further may be used to create the example displays of FIGS. 4-10. The following provides a brief overview of the operations of FIG. 1, which will be described in more detail further below in this disclosure.

At operation 1*a*, an authentication request is sent to the authentication server/kernel 150. The authentication request may include authentication credentials, such as a username, password, biometric data, and so forth. In response, at operation 1*b*, if the authentication is successful, an OK message (e.g., a 200 OK message) may be sent, along with an authentication token, to the user computing device 102. Alternatively, if the authentication is not successful, an error message may be sent to the user computing device 102.

At operation 2*a*, the authentication token (or other identifier corresponding to the authentication token) is sent to the pinboard server 104 along with a get pin blocks request. In this regard, it should be understood that pins or pin blocks correspond to server-side applications. In response, at operation 2*b*, a saved state of the pin blocks of the user is sent to the user computing device 102. In some embodiments, the saved state of the pin blocks includes a URL corresponding to each pin block.

At operation 3*a*, a get pins available message is sent to the pinboard server 104. In response, at operation 3*b*, a list of all pins is sent to the user computing device 102. In some embodiments, the list of pins (e.g., server-side applications) includes, for each server-side application of the list of applicable server-side applications, a respective address for obtaining data from the respective server-side application. Furthermore, in some embodiments, when one of the respective regions of the user interface is activated, a message is transmitted to the respective server-side application via a different address for obtaining further data from the respective server-side application; the further data represents an interactive user interface displayed in another region of the user interface. As will be described further below, the list of all pins may then be filtered by the pinboard application 116 before it is displayed.

At operation 4*a*, a save pin block state message is sent to the pinboard server 104. In response, at operation 4*b*, an OK message is sent to the user computing device 102.

At operation 5*a*, the pinboard server 104 sends a register message to the application server 170. This allows the pinboard server 104 to maintain a repository of pin blocks available. At step 5*b*, the application server 170 sends an OK message or an error message back to the pinboard server 104. Further at step 5*b*, information of an application that is run or maintained by the application server 170 may be sent to the pinboard server, and this information may be stored in information 126.

Figure 2:
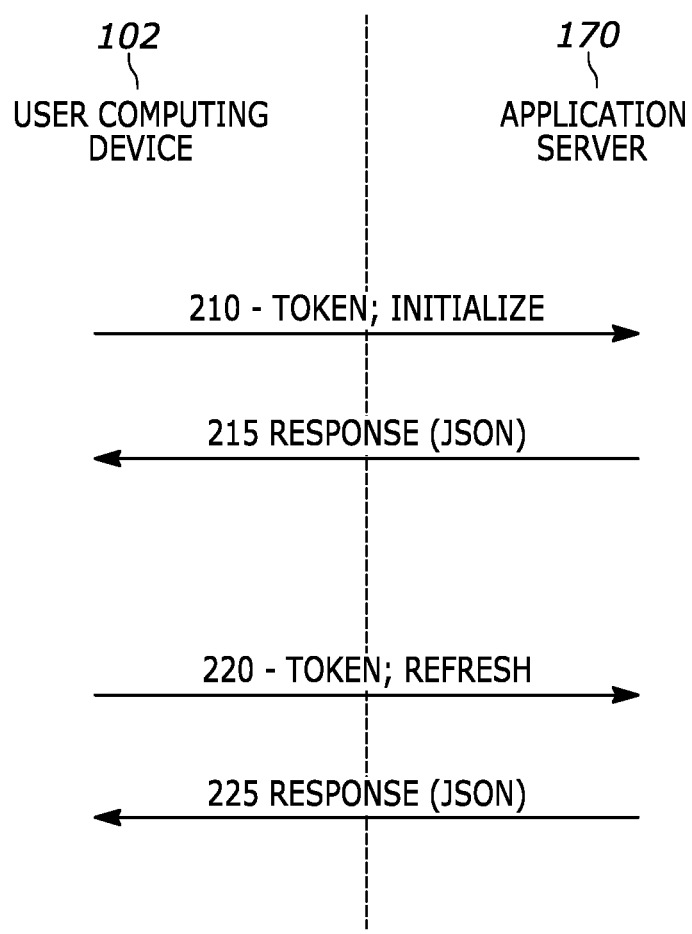
FIG. 2 illustrates an example messaging diagram, including initializing and refreshing a pin block.

FIG. 2 illustrates an example messaging diagram, including initializing and refreshing an application. In some embodiments, the operations of FIG. 2 are performed after the operations of FIG. 1. However, it should be understood that the operations of FIG. 2 may be performed at any point subsequent to operation 1*b* of FIG. 1.

With reference to FIG. 2, at operation 210, an initialization message is sent from the user computing device 102 to the application server 170. The initialization message may include a uniform resource locator (URL), such as a URL that was sent to the computing device 102 at operation 2*b*. The initialization message, in the illustrated example, includes the authentication token described with respect to FIG. 1. In some embodiments, this allows the application server 170 to retrieve the user's credentials corresponding to the authentication token by making calls to the authentication server/kernel 150.

At operation 215, the application server 170 sends a response, for example in JavaScript Object Notation (JSON), to the user computing device 102. This allows the user computing device 102 to either run an application indicated in the response, or to display an application run on the application server 170 (e.g., display a "native" application running on the application server). Furthermore, the response may include data, such as a time period after which a repeat initialization call must be made etc., and/or if subsequent calls for refreshing the pin block data must be made from a different URL. The data also may include all information necessary for the pinboard application 116 to run or utilize the application. For example, the data may include data to display various charts and graphs.

At operation 220, a refresh message may be sent from the user computing device 102 to the application server 170. The refresh message may further include a URL. At operation 225, the application server 170 may send a response (e.g., in JSON) to the user computing device 102 to refresh any information. The response may include any data, such as data to update various charts and graphs.

FIG. 3 illustrates a collection of example pin blocks 300, which includes example pin blocks in accordance with various embodiments disclosed herein. For instance, pin block 310 illustrates a total hours schedule for today for a user.

In some embodiments, there are two types of pin blocks: information pin blocks and picture pin blocks. The picture pin block (e.g., 320 of FIG. 3), apart from the optional title (e.g., on a top left corner), has only a picture in the entire body of the pin block, and only one touch operation can be performed on it: to invoke another handheld application. In some implementations, typical use of this pin block is to provide a chart of some kind to pique the interest of the user into touching the picture to transfer control to the application rendering the chart.

An information pin block (e.g., 330 of FIG. 3), in some embodiments, will have distinct areas within the body of the pin block. The left top corner may be a title, the right top corner may hold an icon, and the bottom may have lines of text where each line may have different styling requirements. This may aide in the pin block showing prominence in the first line and more detail or sub information on the second line.

Figure 4:
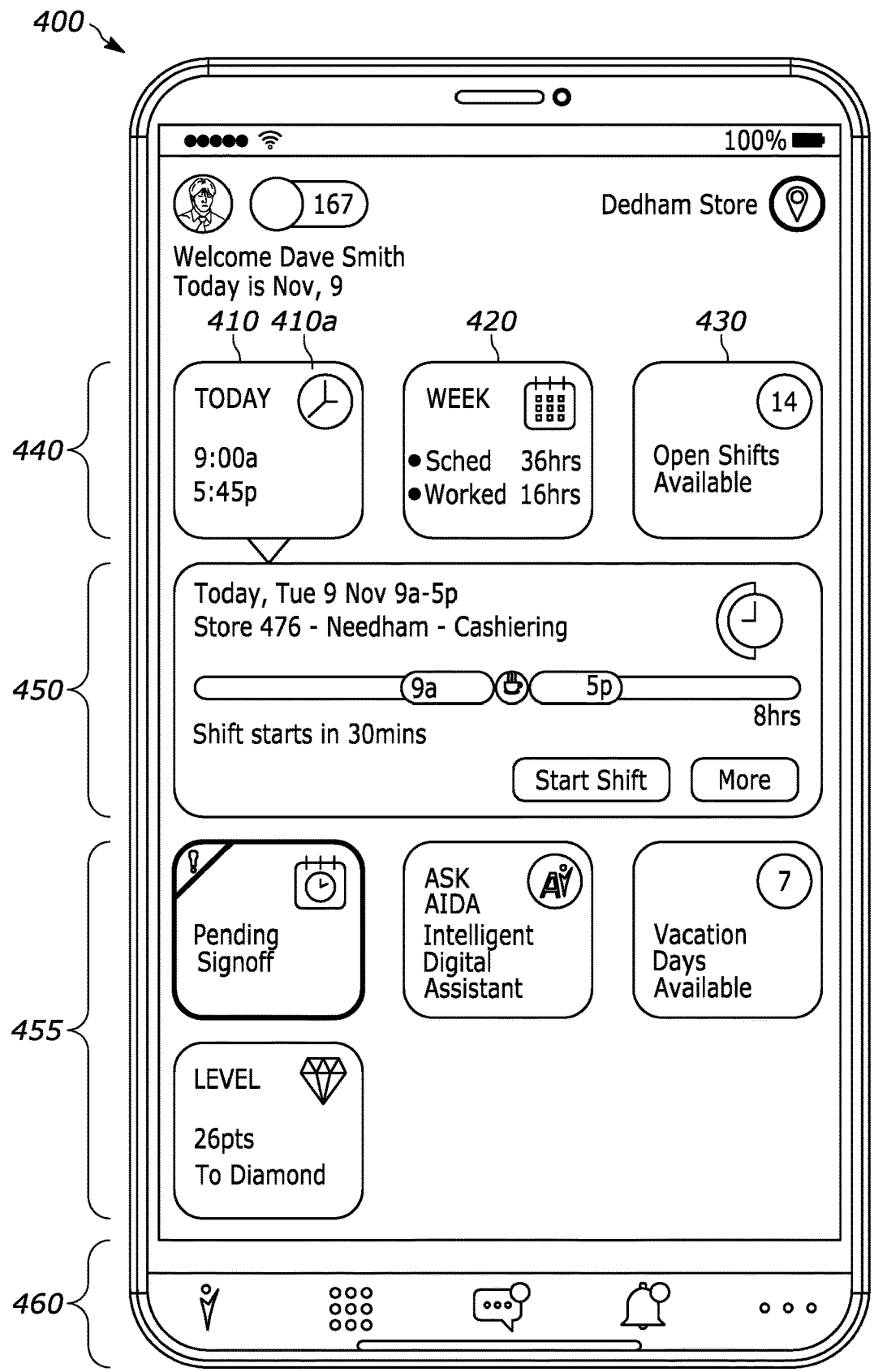

FIG. 4 illustrates an example display 400. In the example of FIG. 4, the pin blocks 410, 420, 430 are shown in a first row(s) 440 of the display. In the illustrated example, the pin block 410 occupies the first region 410*a*. In some embodiments, the user may select a pin block. In this regard, in the example of FIG. 4, the user has selected pin block 410; and, in response to this selection, additional information corresponding to pin block 410 is displayed in second region 450. In some aspects, this additional information is implemented as a web view. The additional displayed information may be information from the application server 170 (e.g., retrieved from the response 215 or 225), or information that was previously stored on the user computing device 102. In some embodiments, the pinboard application 116 displays the obtained data on the display of the mobile device based on a template for a region (e.g., the second region 450) of the display.

The arrangement or format of the pin blocks 410, 420, 430, may be determined by any of the pin board server 104, the pinboard application 116, and/or the user. For instance, the pinboard server 104 may determine an arrangement of the pin blocks 410, 420, 430, for example, placing the most frequently used pin block in the first region 410*a*; however, a user may then manually change this by placing any other desired pin block in the first region 410*a*. Furthermore, the pinboard application 116 may determine a subset of the pin blocks/server-side applications to display additionally or alternatively based on user input. In another example, the pinboard application 116 arranges the regions of the user interface occupied by the pin blocks based on any number of (i) a geolocation of the mobile device, (ii) a user profile activated on the mobile device, (iii) a time of day, (iv) a date, or (v) an activity associated with a user. In yet another example, the pinboard application 116 enables the user to rearrange the regions of the user interface.

Figure 5:
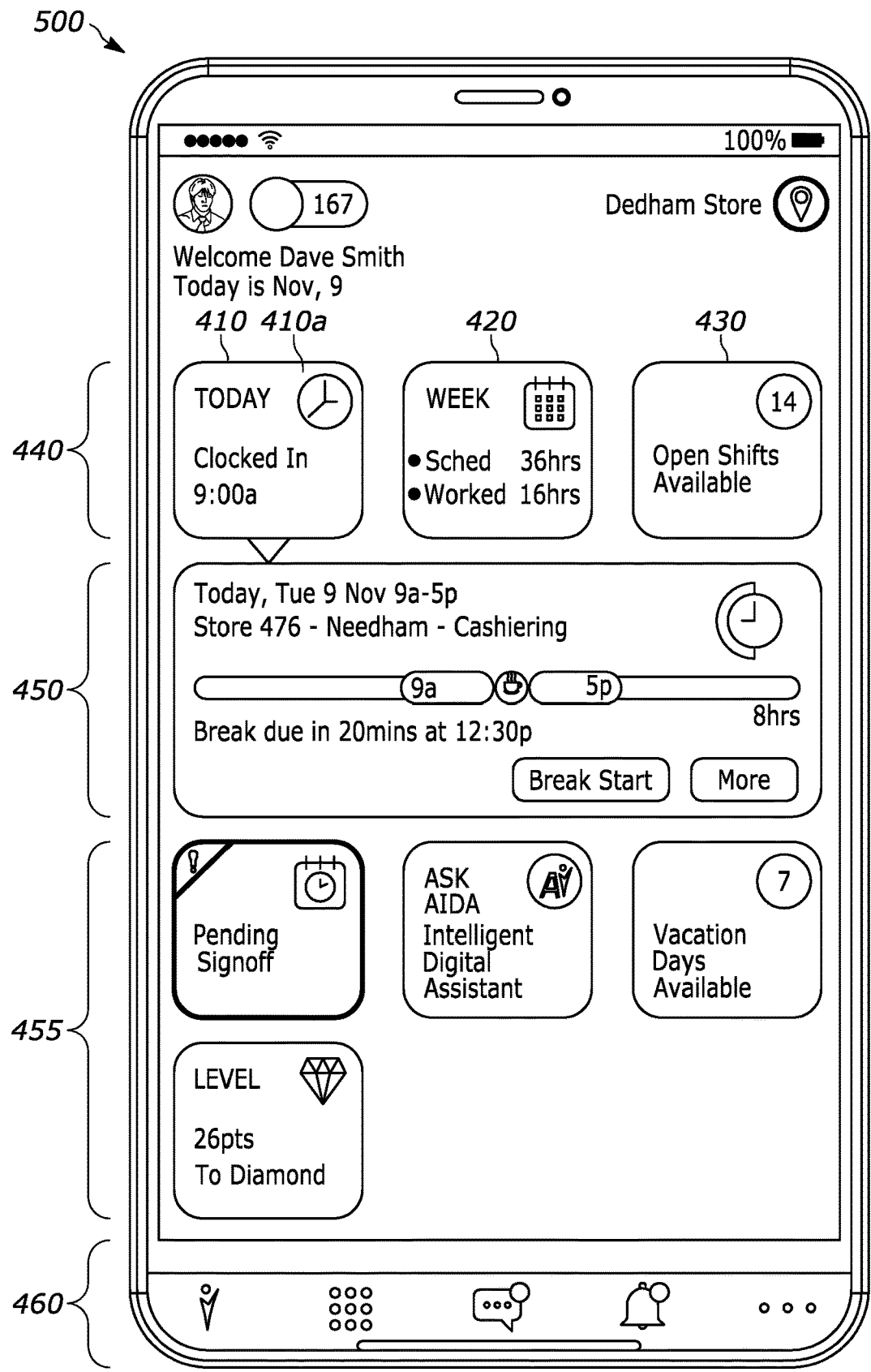
Figure 6:
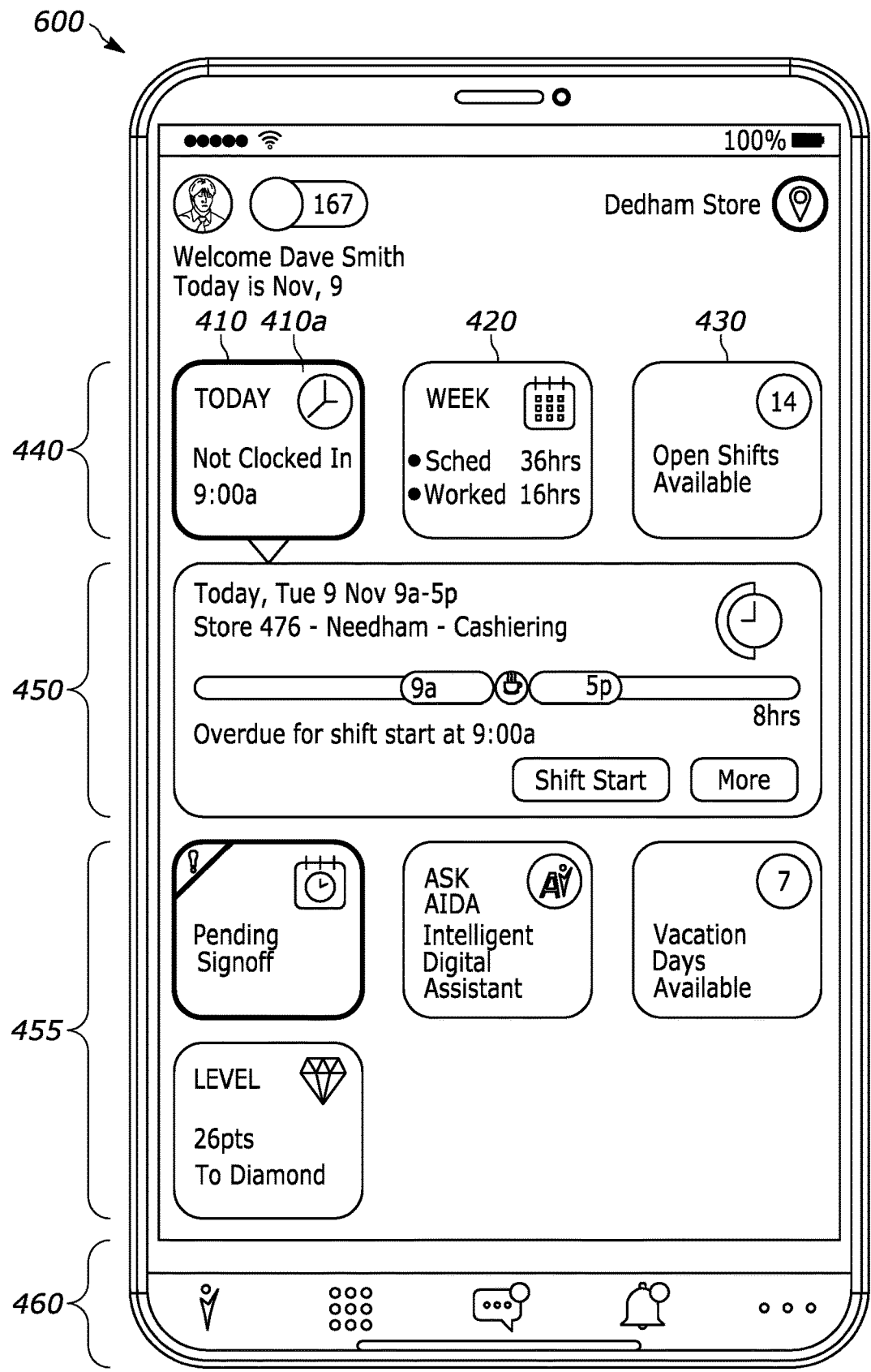
FIG. 6 illustrates an example display where the user has not clocked in, and is overdue for a shift start.

FIG. 5 illustrates an example display 500, which is similar to the example of FIG. 4, except that the user has clocked in (e.g., as indicated in the difference between pin block 410 in FIG. 4 and pin block 410 in FIG. 5). FIG. 6 illustrates an example display 600, which is similar to the example of FIG. 4, except that the user has not clocked in, and is overdue for a shift start.

In some embodiments, the first row(s) 440 is top row that is reserved for automatic pin blocks to be displayed. These would be activated/displayed by supported applications when an event of interest or importance occurs and needs the user to know or act on it. This top row may also be horizontally scrollable for additional pin blocks and suitable indicators may appear on the left and right indicating existence or absence of additional pin blocks. Optionally, a number badge can be shown after/before the left/right more icon indicators to show the number of such icons remaining in the corresponding direction. In some embodiments, so that such automatic additions do not cause a jarring effect on the rest of the screen for the user, this row alone is horizontally scrollable to accommodate the new pin blocks that are displayed. This row can be hidden or used for the usual normal pin blocks if no automatic pin blocks are present.

Row(s) 455 below the first row(s) 440 and second region 450 will display normal pin blocks from multiple applications, which are sometimes multiple pin blocks from the same application etc. In some cases, some pin blocks may not be displayed and will only be displayed if there is a need. For instance, in a work-related example, if there is no leave approval pending, then such a pin block may not be displayed until necessary. In this way, it is possible save display space and show only the relevant and applicable pin blocks.

To further elaborate, upon selection of a pin block in the first row(s) 440 or row(s) 455, an expanded area opens in the second region 450 of a fixed size, and additional information is displayed, potentially allowing the user to perform some minimal operations, such as to check a box or enter a field and select an action button or touch a "more" button to take the user to the full application on the handheld. In some embodiments, the second region 450 fills the entire display below the first row(s) 440. In some embodiments, the second region 450 hosts a web view which is painted by a server application as it would render a web page, complete with html, javascript and the like. At least some events encountered on this pin extension will be handled by the javascript and may result in further server interactions.

The pin block itself (e.g., the pin blocks 410, 420, 430 of the first row(s) 440 and the pin blocks of row(s) 455) may respond to events such as swipe left, right, up and down. In some embodiments, one of these actions is reserved for turning the pin block off. The other actions are configurable. This may require either the authentication server 170 or the pinboard server 104 to provide URLs to call when such events happen on the device on the pin block.

In some embodiments, each of the pin blocks additionally display an alert or an exceptional situation by highlighting the border with different colors—for example, green indicating all is well, and red indicating attention is required. Some embodiments establish a convention to follow to signify various levels of alarm.

Further, in some embodiments, each of the pin blocks will be initialized with data by making a call to an application server 170. The data sent by the application server 170 in response to such a call also provides refresh requirements, such as a time period after which a repeat initialization call must be made etc., and/or if subsequent calls for refreshing the pin block data must be made from a different URL.

Further, in every subsequent call, the next refresh URL can be provided by the application server 170. If not, the previous such URL received will be used for refresh. Also, the application server 170 can optionally stop the refresh from happening as well until a future time when the user manually performs an action that refreshes the pin block data and provides the refresh interval again. The application server 170 may also advise the pin block to hide itself or display itself. Therefore the pin block itself should be present as a semi-active item regardless of its display state and performing the refresh URL at the specified interval. The application server 170 may also provide a border highlight advice, which enables the pin block to alter its appearance, again when the refresh URL is called. The pin block itself may change its border appearance as well depending on a timer or as a result of other device related events. The application will not reset the border color if the server has requested a change of border color unless specifically requested by the application server 170 to do so. In the meantime, if the device related event also suggested a change of color, it may decide on a severity level of the change in deference to the server advice.

If the application server 170 returns an error to the initialize URL because of lack of permissions or version compatibility problems between the pin block and the server software, the pinboard application 116 handles that and hides the pin block.

In some embodiments, there is a button in the more area of the toolbar 460 in the bottom edge of the device app that may take the user to the list of other such pin blocks available. All such pin blocks are subject to permissions mechanism that is pervasive throughout the application.

In some embodiments, authentication occurs in the beginning, and any token received as a result of a successful authentication is passed to every URL access performed by the application until the user logs out. Any application that wishes to be depicted in the pinboard app will need to authenticate via the authentication server/kernel 150. Trusted external applications may need to contact the authentication server/kernel 150 to obtain an equivalent token providing other trust means such as a site token etc.

In some embodiments, the user may opt to close out a pin block (e.g., set the display state to hide). In this regard, a long press on the block may provide an "x" button, and pressing the "x" button may cause the pin block to be hidden.

In some implementations, the pinboard application 116 checks the geofencing coordinates supplied with a pin block and accordingly hides and displays the pin block. In other words, pins may be hidden or displayed based on the location (e.g., geolocation) of the user computing device 102. This will override even a server level directive to keep the pin block displayed.

To further explain the selection of which pins to display or hide, in some embodiments, the pinboard application 116 receives a full list of applicable pins from the pinboard server 104. The pinboard application 116 then filters the full list of pins base on any criteria. The filtering criteria may include: i) a geolocation of the mobile device, (ii) a user profile activated on the mobile device, (iii) a time of day, (iv) a date, and/or (v) an activity associated with a user.

The pin block category can be used to group the pin blocks to make it easier for the users to find the pin blocks they seek. The pinboard application 116 should present the pin blocks available by category when presenting the list of available pin blocks.

The pinboard server 104 may maintain a list of such pin blocks available system-wide, as well as a list of user-specific pin blocks based on the user's preferences and permissions. Further, the complete interface and persistence details for storing and interacting with the pin blocks will be maintained by the pinboard server 104.

In some embodiments, the pinboard server 104 maintains a repository of pin blocks available. Here, any application that needs to post a pin block should register it with the pinboard server 104. In some implementations, this requires a PinBlockRegister and a corresponding PinBlockUnregister call. Since this involves a whole host of parameters, the structure of such a registration requires a large amount of information to be provided.

When the pinboard application 116 requests the applicable pin blocks for the current logged in user (e.g., by means of the token provided), the server should return a list of the pin blocks subject to permissions for that user. These would be the specific pin blocks that the user is eligible to use. Each such pin block spec would include the initialize URL, other parameters, if any, may include refresh rate, refresh URL, extension block URL (if extension block is required), border state, popup state, etc.

In some embodiments, when the user requests to select from a repository of pin blocks, a name, and description information of the pin blocks is provided to the pinboard application 116, so the user can select the desired pin block.

Each pin block may issue an initialize call to the application server 170 using the initialize URL provided with the response to the initial list for the current logged in user. The response to the initialize call may be to provide the data required for the pin block to paint the face.

In some embodiments, the refresh URL and refresh interval are used to refresh the data shown on the face of the pin block. This URL may return the next refresh URL to be called (if different), border state, pin block specific data, closedown flag, etc. More fields can be added here if required and interpreted by the pin block.

In some embodiments, based on any of (i) a geolocation of the mobile device, (ii) a user profile activated on the mobile device, (iii) a time of day, (iv) a date, or (v) an activity associated with a user, the pinboard application 116 may be configured to transmit messages to respective ones of a subset of the plurality of server-side applications that include a request for data from the respective server-side application. Furthermore, in some embodiments, a first of the messages requests a subset of data from the respective server-side application. Moreover, time periods may be taken into account. For instance, during a first time period, the pinboard application 116 may: select a first subset of a plurality of server-side applications based on at least a first of any of (i) a geolocation of the mobile device, (ii) a user profile activated on the mobile de-vice, (iii) a time of day, (iv) a date, or (v) an activity associated with a user; transmit messages to respective ones of the first subset of the plurality of server-side applications that each include a request for data from the respective server-side application; and responsive to receiving data from each of the first subset of the plurality of server-side applications, display the data in a respective region of a user interface on a display. And, during a second time period, the pinboard application 116 may be further configured to: select a second subset of a plurality of server-side applications based on at least a second of any of (i) a geolocation of the mobile device, (ii) a user profile activated on the mobile device, (iii) a time of day, (iv) a date, or (v) an activity associated with a user; transmit messages to respective ones of the second subset of the plurality of server-side applications that each include a request for data from the respective server-side application; and responsive to receiving data from each of the second subset of the plurality of server-side applications, display the data in a respective region of the user interface on the display.

The pinboard application 116 should periodically check for popup pin blocks. Specifically, it should inspect the popup pin blocks flag returned in the original call for list of pin blocks and perform the refresh URLs of those blocks regardless of whether they are showing or not. If the popup state changes, it should display those blocks in the top bar in the horizontally scrollable list.

In some embodiments, when the pin block implements an extension block (e.g., in the second region 450 of FIG. 4), it creates a web view of the fixed size and call the specific extension URL specified. The URL would be rendered within the web view. The web view may intercept any access to mobile:// and redirect to either a local form or application on the device. Ideally, this should be used by the "More" button (if required) in the extension block that is expected to invoke the specific app on the mobile device.

Further regarding the web view, in some embodiments, the information/data included in the web view is obtained in a second query following a first query to the application server 170. More specifically, in some embodiments, the application server 170: in response to a first query received from the user computing device 102 at a first URL assigned to an instance of an application executing on the application server 170 for a user, provides a first subset of data related to the instance of the application that represents information to be displayed in a first region 410a of a first user interface on a display of the user computing device 102; and in response to a second query received from the user computing device 102 at a second URL assigned to the instance of the application, provides information that represents the web view to be displayed in the second region 450 of the first user interface to enable the user to operate first aspects of the instance of the application.

In some embodiments, data is sent or returned using JSON. This way, if a field is not required, it can be left out in the returned JSON object.

In some implementations, certain (e.g., rogue) applications may cause uncannily high refresh rates. Thus, in some embodiments, a refresh rate requested by the server is superseded by the default set in the device app in deference to the larger number. There may be exceptions required for this policy, which may be configured by the pinboard application 116. Such rapid refresh rates may also be curtailed after either a preset number of iterations or preset time.

The picture pin block may be used to serve as an icon for launching other applications, thereby reducing the springboard to a launcher; however, this is preferably discouraged so that the springboard serves as more than merely a launcher.

Failed URL accesses may be gracefully indicated by a change in the border color. If URL access fails more than a preset number of times, the refresh URL fails, and the corresponding pin block may be hidden.

In some embodiments, the pinboard application 116 may redirect all URL calls through the PinBoard Server so separate firewall rules may not be required for all servers as well as third party cloud systems.

Figure 7:
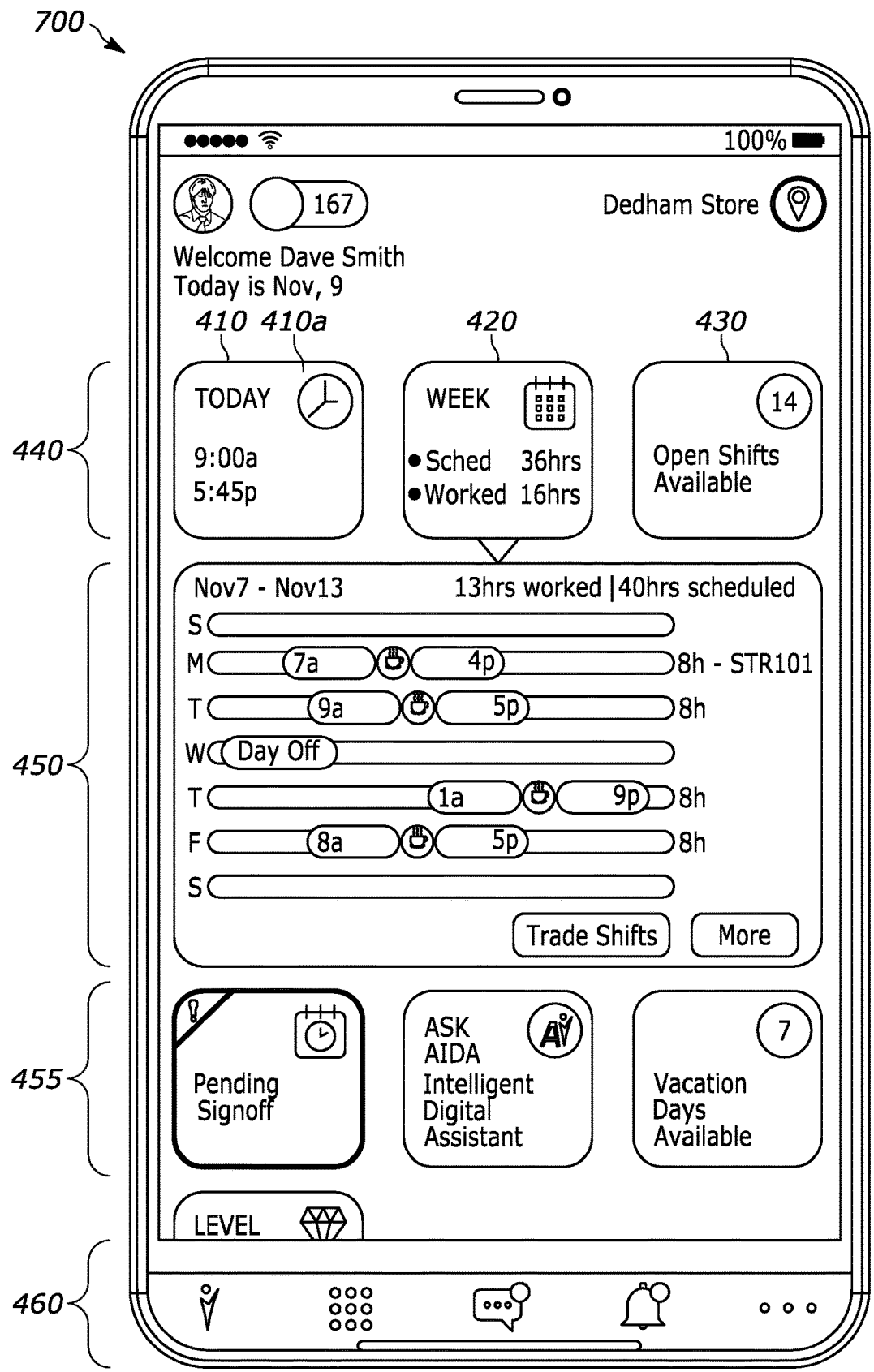
FIG. 7 shows an example where the user has selected a week view pin block.
Figure 8:
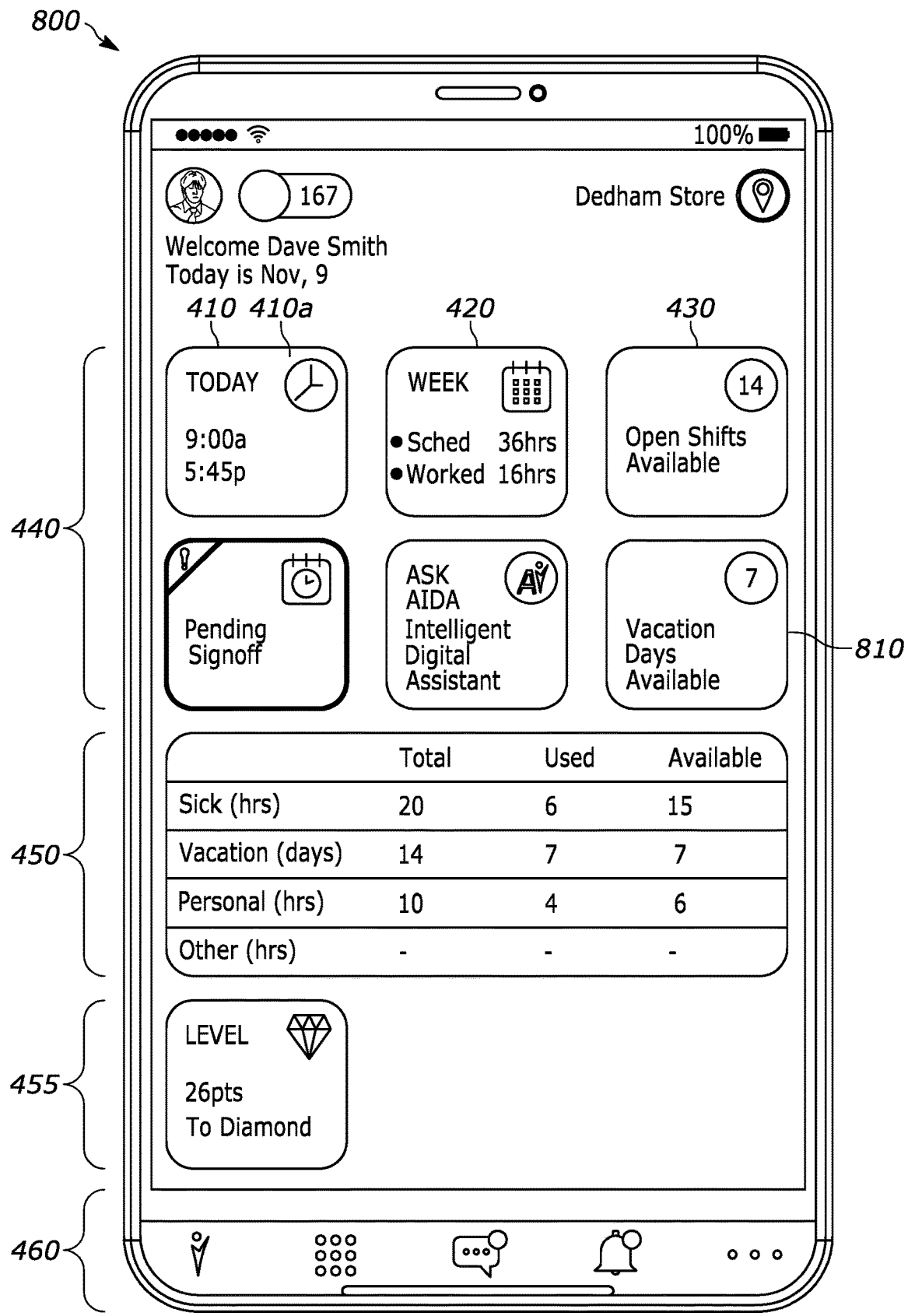
FIG. 8 shows an example where a user has selected a vacation days available pin block.
Figure 9:
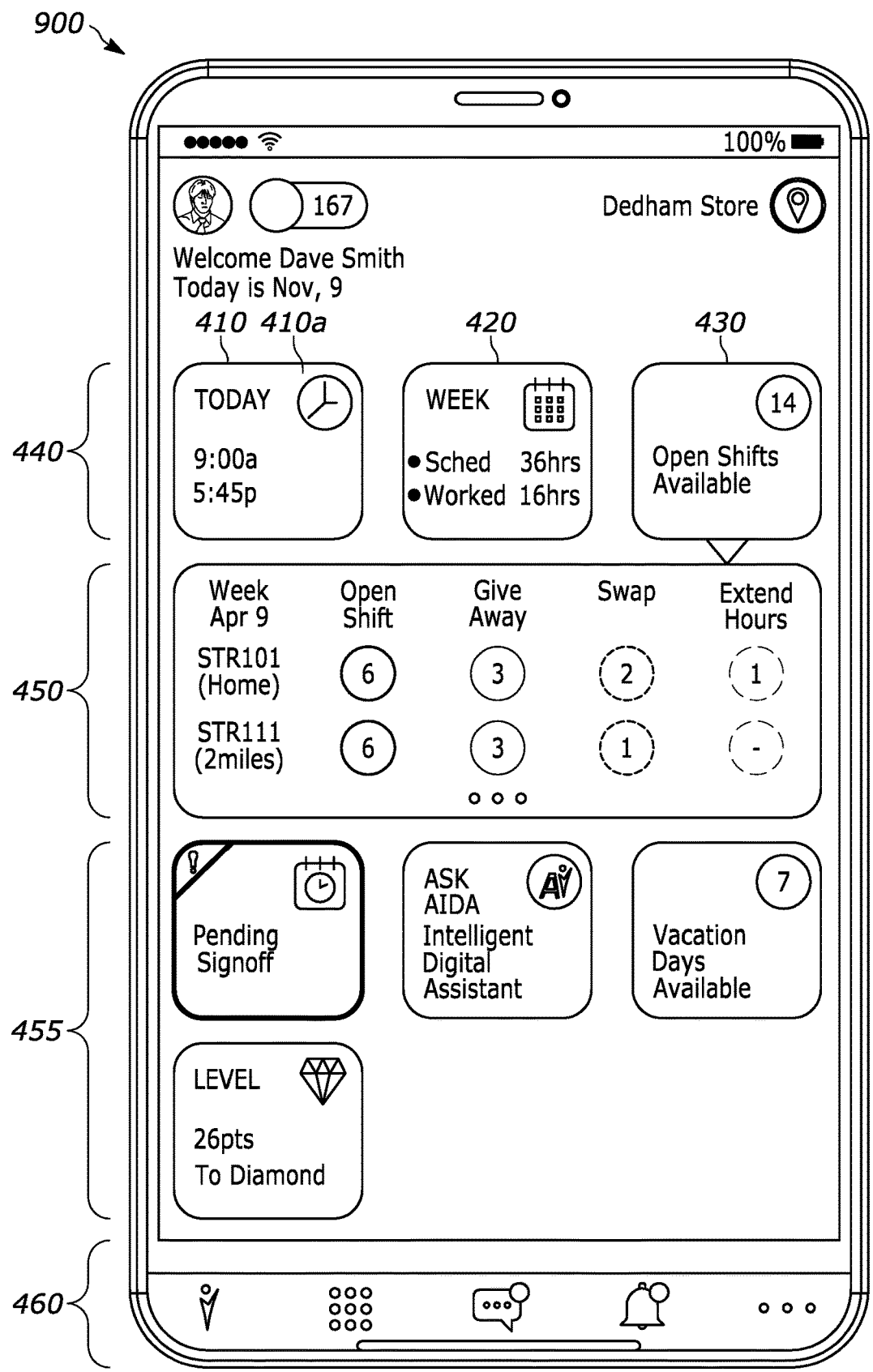
FIG. 9 shows an example where a user has selected an open shifts available pin block.

Returning now to the example displays of FIGS. 4-10, display 700 of FIG. 7 shows an example where the user has selected a week view pin block 420. FIG. 8 shows an example display 800 where a user has selected a vacation days available pin block 810. FIG. 9 shows an example display 900 where a user has elected an open shifts available pin block 430.

Figure 10:
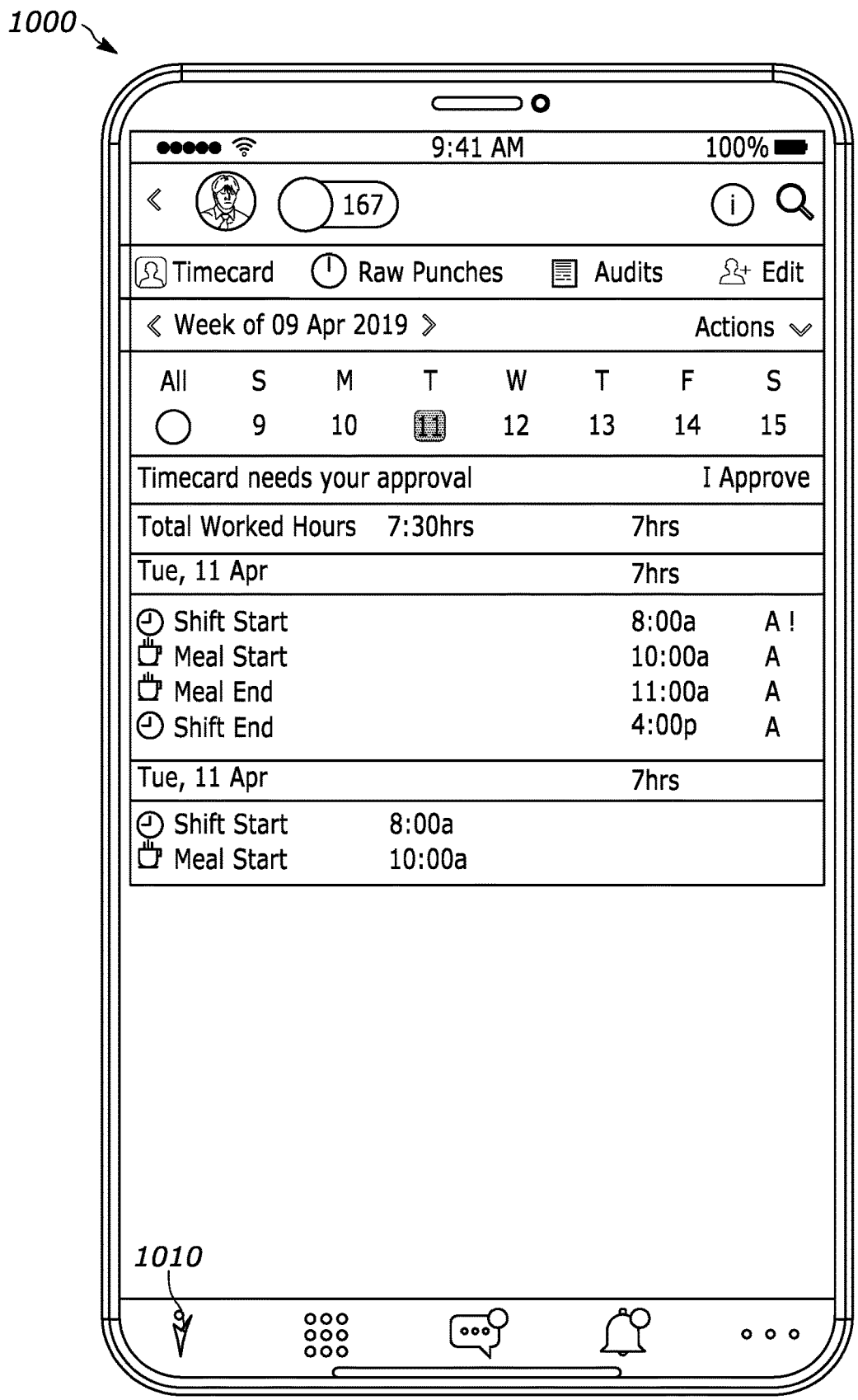
FIG. 10 illustrates an example of a full application or webpage.

FIG. 10 shows an example display 1000 where the user computing device 102 displays a full application or webpage run from the application server 170 (e.g., a native application). In this regard, running the application on the application server 170 rather than the computing device 102 saves the computing device memory, processing power, battery life, and so forth. A user can switch between the examples of FIGS. 4-9 (which show, e.g., first user interfaces), and the example native application of FIG. 10 (e.g., a second user interface). For example, in some embodiments, the return button 1010 is used to return the display from the second user interface (e.g., displaying the native application of FIG. 10) to the first user interface (e.g., displaying the pin blocks, as in the examples of FIGS. 4-9).

Figure 11:
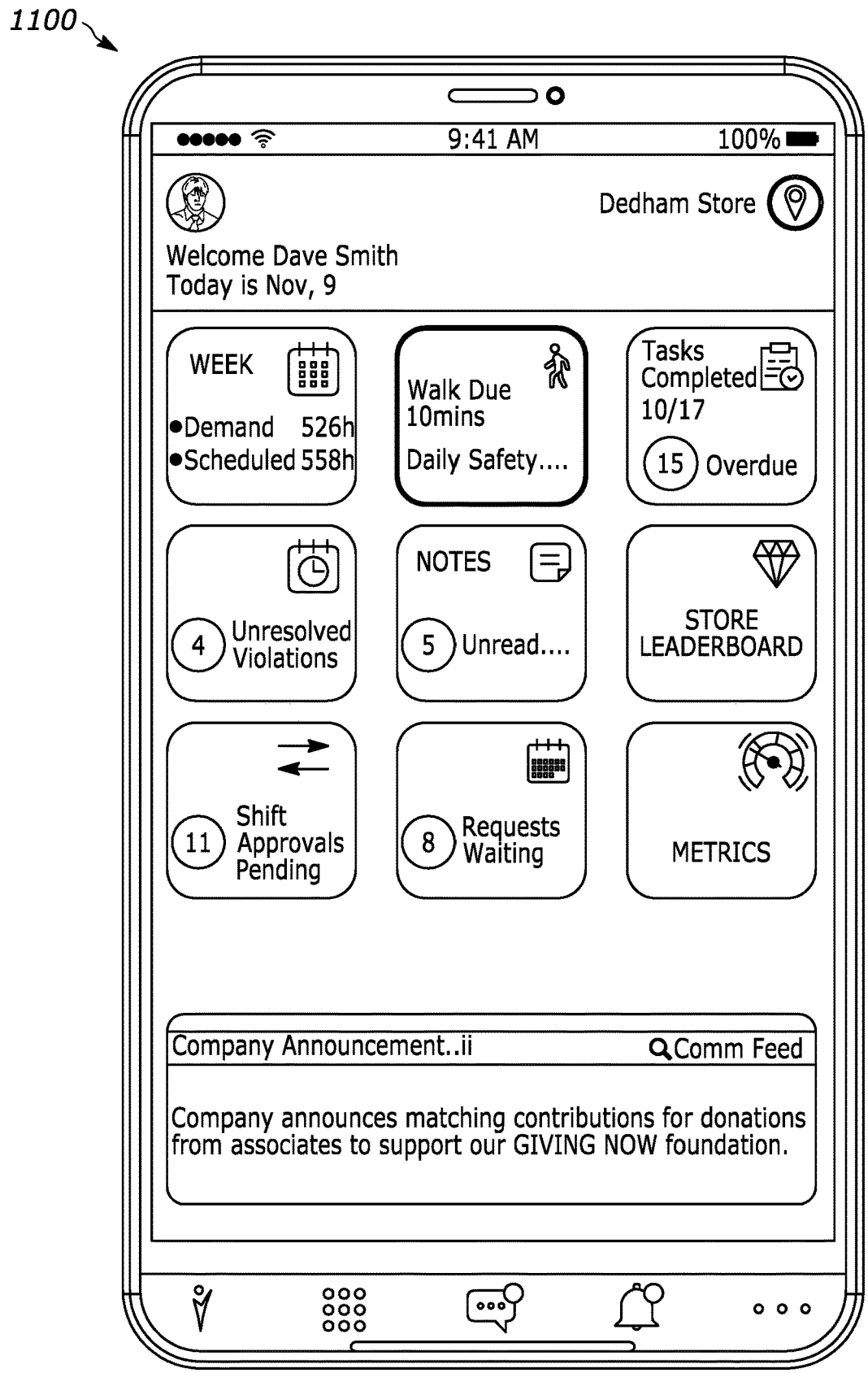
FIG. 11 shows additional examples of pin blocks.

FIG. 11 shows an example display 1100 including additional examples of pin blocks.

Figure 12:
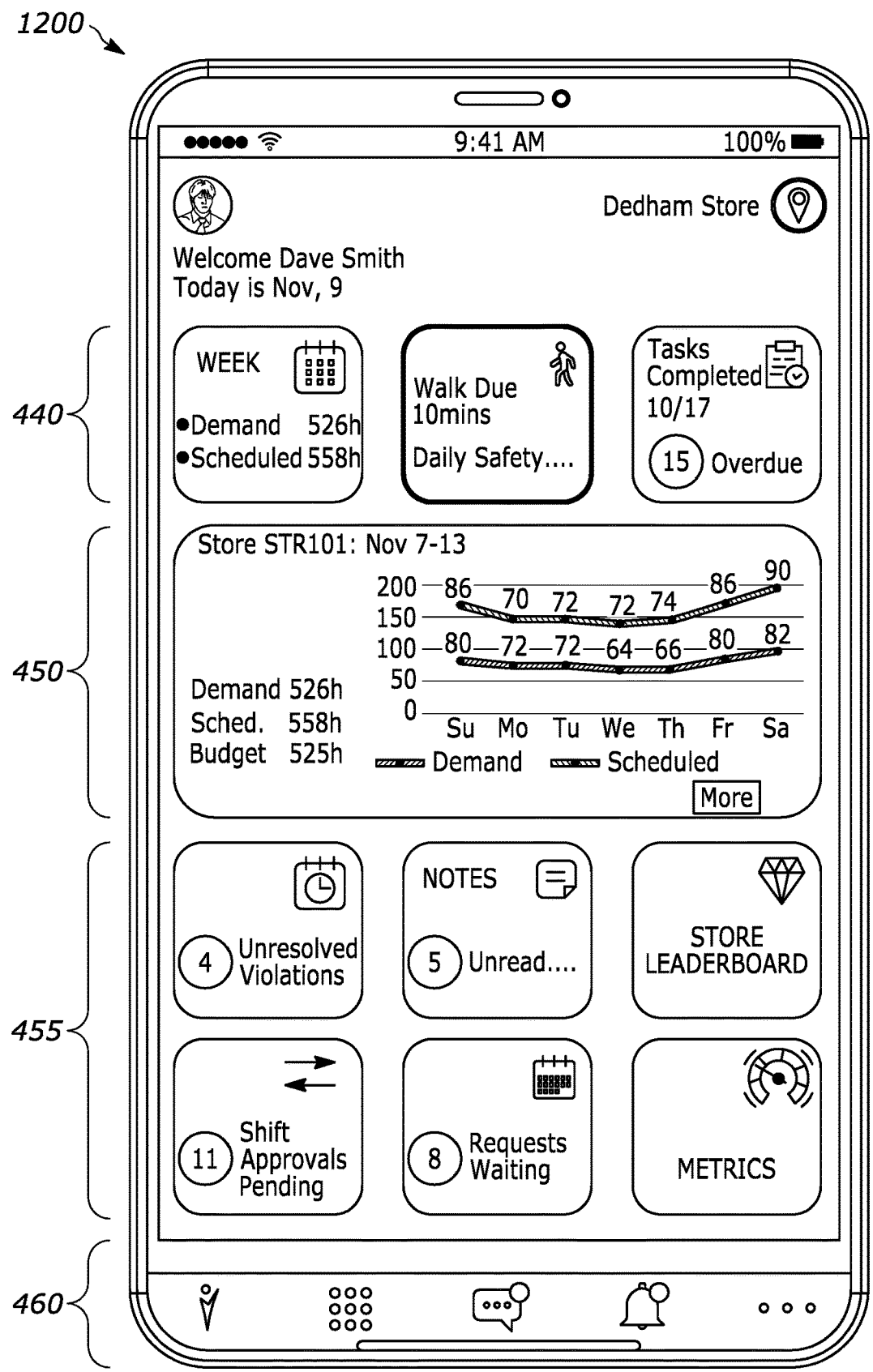
FIG. 12 shows an example where a user has selected a quick view of a week schedule pin block.
Figure 13:
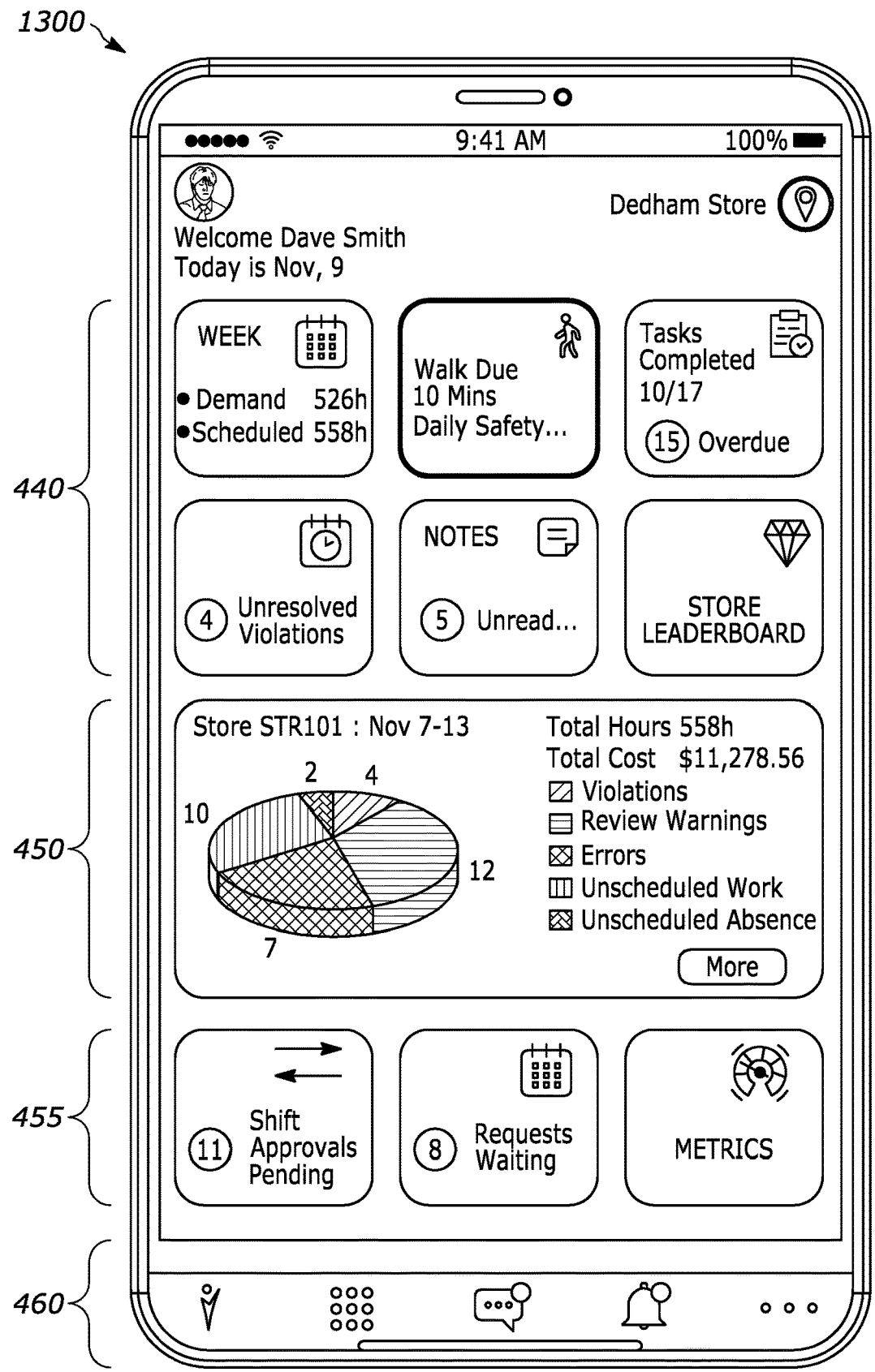
FIG. 13 shows an example where a user has selected a quick view of a timecard pin block.

FIG. 12 shows an example display 1200 where a user has selected a quick view of a week schedule pin block. FIG. 13 shows an example display 1300 where a user has selected a quick view of a timecard pin block.

To further illustrate certain aspects of this disclosure, the following will discuss working examples. Particularly, the working examples will illustrate how the following criteria are used in accordance with certain principles disclosed herein: (i) a geolocation of the mobile device, (ii) a user profile activated on the mobile device, (iii) a time of day, (iv) a date, or (v) an activity associated with a user. Broadly, it should be noted that these criteria may be used to determine, for example: which pin blocks to obtain information for (e.g., determine which pin blocks the mobile device should transmit messages for); which pin blocks are displayed; and/or how to arrange the pin blocks on the display of the mobile device. It should further be noted that, in the following examples, the decisions/determinations regarding these criteria may be made by the pinboard application 116, the pinboard server 104, the application server 170, and/or any other system component.

In a first illustrative example, a geolocation of the mobile device may be used. As an initial matter, it may be noted that global positioning system (GPS) data of the mobile device (e.g., the user computing device 102), or any other suitable data may be used to determine the geolocation of the mobile device. In this illustrative example, consider the geolocation of a particular venue (e.g., a warehouse) and a particular location within the venue (e.g., a loading dock within the warehouse). In this example, particular pins may be displayed in the first row(s) 440 based on the geolocation of the loading dock. For instance, a tasks completed pin (see, e.g., FIG. 13) may be displayed which relates to tasks to be completed at the loading dock. In a variation of this example, the venue (e.g., the warehouse), rather than the particular location within the venue, may be used. For instance, if a geolocation shows that a warehouse worker (e.g., the user) is located in the warehouse, a pin may be displayed that allows the warehouse worker to clock in. Conversely, once the geolocation indicates that the mobile device is no longer located in the warehouse, a pin that allows the user to clock out may be displayed.

In a second illustrative example, a profile of a user may be used. For instance, the profile may include information of if the user is a manager. And, if the user is a manager, the manager may be required to walk the grounds during preset time periods. In this regard, a walks due pin block may be displayed (see, e.g., the walks due pin block in 440 of FIG. 12). In a related example, if the user profile indicates that the user is an hourly worker, an open shifts available pin may be displayed (see, e.g., 430 of FIG. 4). In another example, the user's profile may be used to determine vacation days available to the user (see, e.g., 810 and 440 of FIG. 8). In yet another example, the user profile may be used to determine which other workers a user is eligible to trade shifts with (see, e.g., 450 of FIG. 7).

In a third illustrative example, a time of day may be used. For instance, if the time of day is near a scheduled shift start, pins relating to clocking in may be displayed. For example, FIG. 4 shows pin 410, and further shows that a cashier is allowed to clock in by pressing the start shift button.

In a fourth illustrative example, a date may be used. For instance, the date may be used to determine what hours a worker is working on that day (see, e.g., 410 of FIG. 7), or used to determine which week to display a schedule for (see, e.g., 420 and 450 of FIG. 7).

In a fifth illustrative example, an activity associated with the user may be used. For example, a tasks pin where the tasks correspond to the activity associated with the user may be displayed (see, e.g., 440 of FIG. 12). In this regard, the tasks pin may include information of a list of completed tasks, and a list of overdue tasks. The lists of completed and overdue tasks may also be based on the other criteria as well (e.g., the user profile, the time of day, and/or the date). In a related example, the activity may be determined to be barcode scanning; and, the tasks listed by the tasks pin may relate to barcode scanning; furthermore, a notes pin (see, e.g., 440 of FIG. 13) may include notes relating to barcode scanning. In another related example, the activity may be determined to be cashiering, which may be displayed as in 450 of FIGS. 4-6.

Figure 14:
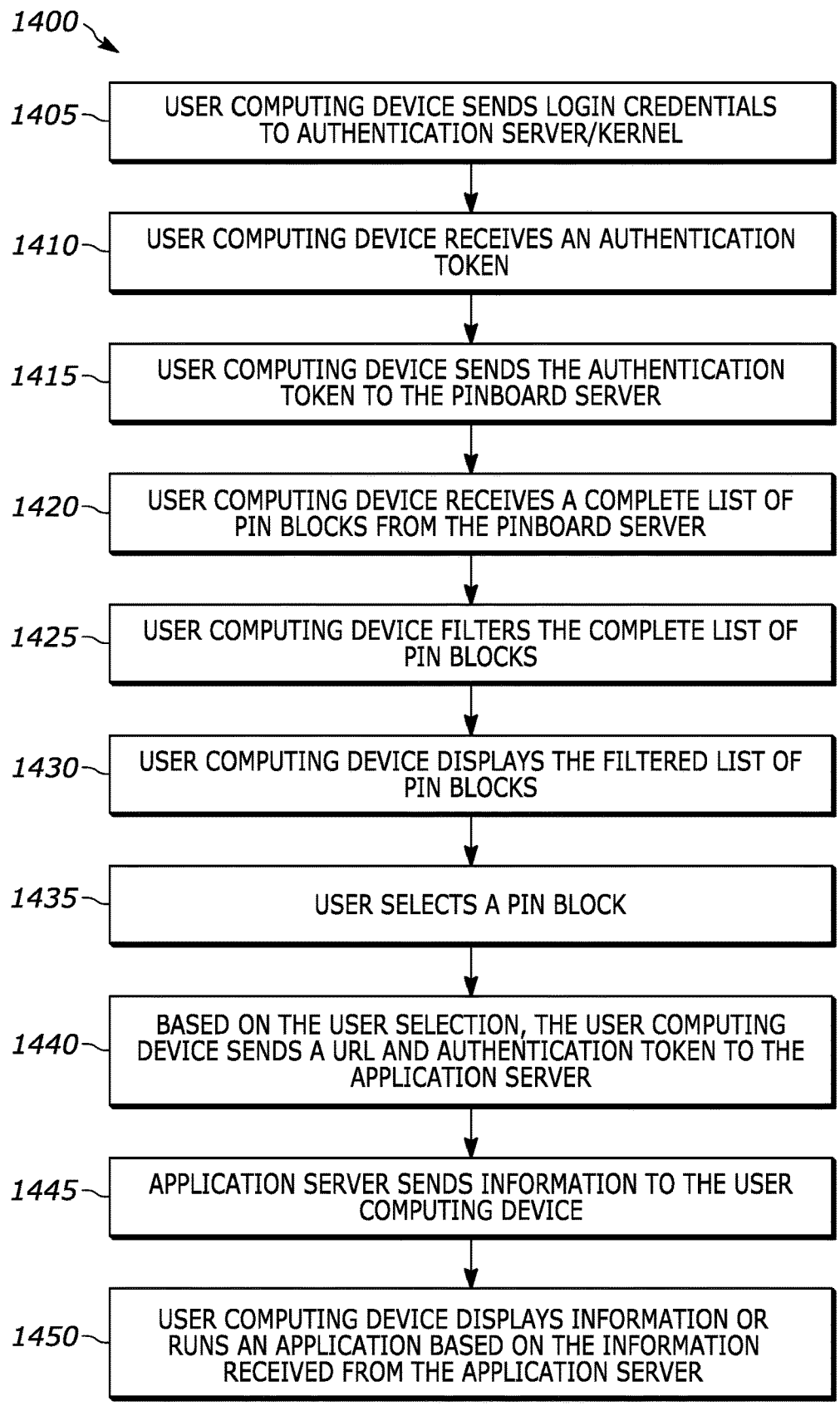
FIG. 14 is a flow diagram of an example method.

FIG. 14 is a flow diagram of an example method 1400. At block 1405, the user computing device 102 sends login credentials to authentication server/kernel 150. At block 1410, the user computing device 102 receives an authentication token from the authentication server/kernel 150. At block 1415, the user computing device 102 sends the authentication token to pinboard server 104.

Next, at block 1420, the user computing device 102 receives a complete list of pin blocks from the pinboard server. At block 1425, the user computing device 102 filters the complete list of pin blocks. For example, the pin blocks may be filtered based on (i) a geolocation of the mobile device, (ii) a user profile activated on the mobile device, (iii) a time of day, (iv) a date, or (v) an activity associated with a user.

At block 1430, the user computing device 102 displays the filtered list of pin blocks. The user may select further pins from the filtered pin blocks so that only the selected pin blocks are displayed. Additionally, the user may arrange the pin blocks on the display. At block 1435, the user selects a pin block. At step 1440, based on the user selection, the user computing device 102 sends a URL and authentication token to the application server 170.

At block 1445, the application server 170 sends information to the user computing device 102. At block 1450, the user computing device 102 displays information or runs an application based on the information received from the application server 170.

Additionally, it is to be understood that each of the actions described in the method 1400 may be performed in any order, number of times, or any other suitable combination(s). For example, some or all of the blocks of the method 1400 may be fully performed once, multiple times, or not at all.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A system comprising:
a server having a server processor, a server memory, and a set of server instructions stored in the server memory, the server being configured to execute the server instructions, via the server processor, to execute a plurality of server-side applications; and
a mobile device communicatively coupled to the server, the mobile device having a display, a mobile device processor, a mobile device memory, and a set of mobile device instructions stored in the mobile device memory, the mobile device being configured to execute the mobile device instructions, via the mobile device processor, to execute a mobile device application, the mobile device application being configured to obtain a list of applicable server-side applications from the server and filter the list of applicable server-side applications to determine a subset of the plurality of server-side applications from the list of applicable server-side applications,
wherein, based on at least two of (i) a geolocation of the mobile device, (ii) a user profile activated on the mobile device, (iii) a time of day, (iv) a date, or (v) an activity associated with a user, the mobile device application is configured to transmit messages to respective ones of the subset of the plurality of server-side applications that include a request for data from the respective server-side application,
wherein, responsive to receiving the one or more messages from the mobile device application, the server-side applications are configured to obtain respective data, and transmit the data to the mobile device application,
wherein, responsive to receiving the obtained data from the subset of the server-side applications, the mobile device application displays the obtained data on the display of the mobile device in respective regions of a user interface, and
wherein, when one of the respective regions of the user interface is activated, transmitting a message to the respective server-side application via a different address for obtaining further data from the respective server-side application, wherein the further data represents an interactive user interface displayed in another region of the user interface.

2. The system of claim 1, wherein the mobile device application is configured to:
determine the subset of the plurality of server-side applications from the list of applicable server-side applications based on the at least two of (i) a geolocation of the mobile device, (ii) a user profile activated on the mobile device, (iii) a time of day, (iv) a date, or (v) an activity associated with a user.

3. The system of claim 2, wherein the mobile device application is configured to arrange the regions of the user interface based on the at least two of (i) a geolocation of the mobile device, (ii) a user profile activated on the mobile device, (iii) a time of day, (iv) a date, or (v) an activity associated with a user.

4. The system of claim 2, wherein the mobile device application is configured to determine the subset of the plurality of server-side applications additionally based on a user input.

5. The system of claim 2, wherein the server is configured to generate the list of all applicable server-side applications based on one or more logon credentials for the user.

6. The system of claim 2, wherein the server is configured to implement an authentication service, and wherein the mobile device application is configured to:
authenticate the user with the authentication service based on one or more logon credentials to obtain an authentication token, and
obtain the list of applicable server-side applications from the server based on the authentication token.

7. The system of claim 2, wherein the list of applicable server-side applications includes, for each server-side application of the list of applicable server-side applications, a respective address for obtaining data from the respective server-side application.

8. The system of claim 7, wherein the address comprises a uniform resource locator.

9. The system of claim 1, further comprising an application server having an application processor, an application memory, and a set of application instructions stored in the application memory, the application server being configured to execute the application instructions, via the application processor, to execute a third-party server-side application, wherein, based on the at least two of (i) a geolocation of the mobile device, (ii) a user profile activated on the mobile device, (iii) a time of day, (iv) a date, or (v) an activity associated with a user, the mobile device application is configured to transmit a message to the application server to obtain data from the third-party server-side application.

10. The system of claim 1, wherein the mobile device application is configured to display the obtained data on the display of the mobile device based on based on at least two of (i) the geolocation of the mobile device, (ii) the user profile activated on the mobile device, (iii) the time of day, (iv) the date, or (v) the activity associated with a user.

11. The system of claim 1, wherein the mobile device application is configured to display the obtained data on the display of the mobile device based on a template for a region of the display.

12. The system of claim 1, wherein the messages are transmitted over a network.

13. The system of claim 1, wherein the mobile device application is configured to enable the user to rearrange the regions of the user interface.

14. The system of claim 1, wherein a first of the messages requests a subset of data from the respective server-side application.

15. The system of claim 1,
wherein the subset of the plurality of server-side applications is a first subset of the plurality of server-side applications determined based on a first at least two of (i) a geolocation of the mobile device, (ii) a user profile activated on the mobile device, (iii) a time of day, (iv) a date, or (v) an activity associated with a user during a first period of time, and
wherein the mobile device application is configured to select a second subset of the plurality of server-side applications determined based on a second at least two of (i) a geolocation of the mobile device, (ii) a user profile activated on the mobile device, (iii) a time of day, (iv) a date, or (v) an activity associated with a user during a second period of time, and transmit messages to respective ones of the second subset of the plurality of server-side applications that include a request for data from the respective server-side application.

16. A non-transitory computer-readable medium storing computer-readable instructions that, when executed by a processor, causes a mobile device to:
during a first time period:
obtain a list of applicable server-side applications from a server,
filter the list of applicable server-side applications from the server to determine and select a first subset of a plurality of server-side applications from the list of applicable server-side applications based on at least a first two of (i) a geolocation of the mobile device, (ii) a user profile activated on the mobile device, (iii) a time of day, (iv) a date, or (v) an activity associated with a user,
transmit messages to respective ones of the first subset of the plurality of server-side applications that each include a request for data from the respective server-side application, and
responsive to receiving data from each of the first subset of the plurality of server-side applications, display the data in a respective region of a user interface on a display; and
during a second time period:
filter the list of applicable server-side applications from the server to determine and select a second subset of a plurality of server-side applications from the list of applicable server-side applications based on at least a second two of (i) a geolocation of the mobile device, (ii) a user profile activated on the mobile device, (iii) a time of day, (iv) a date, or (v) an activity associated with a user,
transmit messages to respective ones of the second subset of the plurality of server-side applications that each include a request for data from the respective server-side application, and
responsive to receiving data from each of the second subset of the plurality of server-side applications, display the data in a respective region of the user interface on the display,
wherein the instructions, when executed by the processor, cause the mobile device to, when one of the respective regions of the user interface is activated, transmit a message to the respective server-side application via a different address for obtaining further data from the respective server-side application, wherein the further data represents an interactive user interface displayed in another region of the user interface.

17. The non-transitory computer-readable medium of claim 16, wherein the list of applicable server-side applications is determined based on one or more logon credentials for the user.

18. The non-transitory computer-readable medium of claim 17, wherein, during the second time period:
the determination and selection of the second subset of the plurality of server-side applications is made from the list of applicable server-side applications based on the at least second two of (i) a geolocation of the mobile device, (ii) a user profile activated on the mobile device, (iii) a time of day, (iv) a date, or (v) an activity associated with a user.

19. The non-transitory computer-readable medium of claim 17, wherein the list of applicable server-side applications includes, for each server-side application of the list of applicable server-side applications, a respective address for obtaining data from the respective server-side application.

20. The non-transitory computer-readable medium of claim 19, wherein the address comprises a uniform resource locator.

21. The non-transitory computer-readable medium of claim 16, wherein the display of the data during the first time period comprises arranging the regions of the user interface based on the at least first two of (i) a geolocation of the mobile device, (ii) a user profile activated on the mobile device, (iii) a time of day, (iv) a date, or (v) an activity associated with a user.

22. The non-transitory computer-readable medium of claim 16, wherein the display of the data during the second time period comprises arranging the regions of the user interface based on the at least second two of (i) a geolocation of the mobile device, (ii) a user profile activated on the mobile device, (iii) a time of day, (iv) a date, or (v) an activity associated with a user.

23. The non-transitory computer-readable medium of claim 16, wherein the instructions, when executed by the processor, cause the mobile device to determine the first and second subsets of the plurality of server-side applications additionally based on a user input.

24. The non-transitory computer-readable medium of claim 16, wherein the instructions, when executed by the processor, cause the mobile device to store data from the first subset of server-side applications on a memory of the mobile device.

25. A non-transitory computer-readable medium storing computer-readable instructions that, when executed by a processor, causes an application server to:
in response to a first query received from a remote device at a first uniform resource locator (URL) assigned to an instance of an application executing on the application server for a user, provide a first subset of data related to the instance of the application that represents information to be displayed in a first region of a first user interface on a display of the remote device;
in response to a second query received from the remote device at a second URL assigned to the instance of the application, provide information that represents a web view to be displayed in a second region of the first user interface to enable the user to operate first aspects of the instance of the application;
present a second user interface arranged for the user to operate second aspects of the instance of the application, the first aspects being a subset of the second aspects; and
when at least one of the first and second regions of the first user interface is activated, receive a message from the remote device to obtain further data from the application server, the further data representative of an interactive user interface displayed in at least one of the first and second regions of the user interface.

26. The non-transitory computer-readable medium of claim 25, wherein the second user interface comprises an interface of a native application running on the application server.

27. The non-transitory computer-readable medium of claim 25, wherein the second query comprises a user selection of a block in the first region in the first interface.

\* \* \* \* \*